United States Patent Office 3,562,197
Patented Feb. 9, 1971

3,562,197
WATER-INSOLUBLE AMMONIUM POLYPHOS-
PHATES AS FIRE-RETARDANT ADDITIVES
Paul G. Sears, Lexington, Ky., and Howard L. Vandersall,
Ballwin, Mo., assignors to Monsanto Company, St.
Louis, Mo., a corporation of Delaware
No Drawing. Continuation-in-part of application Ser. No.
514,657, Dec. 17, 1965, which is a continuation-in-part
of application Ser. No. 301,918, Aug. 13, 1963. This
application Jan. 26, 1968, Ser. No. 700,753
Int. Cl. C08c 11/70; C09d 5/18; C09k 3/28
U.S. Cl. 260—28.5          10 Claims

ABSTRACT OF THE DISCLOSURE

Improved intumescing coating compositions are prepared by the use of a substantially water-insoluble ammonium polyphosphate having the formula $$H_{(n-m)+2}(NH_4)_m P_n O_{3n+1}$$

wherein $n$ is an integer having an average value greater than 10 and $m/n$ has an average value between about 0.7 and about 1.1.

---

This is a continuation-in-part of application Ser. No. 514,657, filed Dec. 17, 1965, now abandoned, which was a continuation-in-part of application Ser. No. 301,918, filed Aug. 13, 1963, now abandoned.

This invention pertains to ammonium polyphosphates and more particularly to ammonium polyphosphates which are substantially water-insoluble, to processes for preparing the same and to compositions containing the same.

There are a variety of so-called fire-retardant paints on the market, most of which are intumescent and contain phosphate compounds, such as monoammonium orthophosphate, as a fire-retardant additive. None, however, compare favorably with high-quality standard paint formulations in washability, color versatility, ease of application and storage-stability. In addition, the fire-retardant properties of these paints deteriorate with age after being applied due to the effects of weather and humidity on the relatively water-soluble phosphate. In general, in order to gain widespread acceptance as a fire-retardant additive for use in paints, the phosphate compound should preferably be a non-deliquescent, water-insoluble, solid containing a high phosphorous content and exhibit compatibility with other additives in paint formulations. As can be appreciated, therefore, an ammonium phosphate compound which is relatively water-insoluble and which meets the foregoing properties for a preferred fire-retardant additive in paint formulations would be an advancement in this art.

Therefore, it is an object of this invention to provide new and useful ammonium polyphosphates which are substantially water-insoluble and which are useful as fire-retardant additives in paint formulations, particularly water-based paint formulations.

It is a still further object of this invention to provide paint compositions, particularly water-based paint compositions, containing ammonium polyphosphates which are substantially water-insoluble, said compositions exhibiting fire-retardant properties.

These and other objects will become apparent from the following detailed description.

The term "ammoniacal nitrogen" refers to that nitrogen which is present in the form of ammonium ions and is capable of being removed by the hydrogen form of a strong cation exchange resin, i.e., the hydrogen form of a sulfonate polystyrene resin. The term "non-ammoniacal nitrogen" or "nuclear nitrogen" refers to nitrogen incapable of being removed in the manner of true ammonium nitrogen.

This invention is directed to new and useful substantially water-insoluble ammonium polyphosphates, i.e., those compounds having a P-O-P type linkage, and having the general formula $$H_{(n-m)+2}(NH_4)_m P_n O_{3n+1}$$

wherein $n$ is an integer having an average value greater than 10, $m/n$ has an average value between about .7 and about 1.1 and $m$ has a maximum value equal to $n+2$. The average value of $n$ being greater than 10 is evidenced by the paper chromatography method [Karl-Kroupa, Anal. Chem., 28, 1091 (1956)], and the polymeric P-O-P type linkage is evidenced by N.M.R. spectra which indicate substantially no P-N-P type linkages and essentially no ortho, pyro or short chain P-O-P type groups and by infrared spectra which indicates P-O-P type linkages but does not indicate substantially any P-N-P linkages.

These polymeric polyphosphates can be either straight chain structures or branched chain structures. It should be noted that substantially all of the nitrogen in these polyphosphates is present as the ammoniacal nitrogen and there is substantially no nuclear nitrogen present in the polyphosphates. Although theoretically the ammoniacal nitrogen to phosphorus molar ratio for the polyphosphates of the instant invention approaches about 1, when the polyphosphates are completely ammoniated and $n$ is relatively large, in some cases the molar ratio of ammoniacal nitrogen to phosphorus is less than 1 and it is intended that this invention pertains to those polymeric ammonium polyphosphates having a molar ratio of not less than about 0.7. In addition, when the polyphosphates of the instant invention are characterized herein as being substantially water-insoluble it is intended to mean that the solubility of a slurry of 10 grams of solids/100 cc. of water at 25° C. for 60 minutes is about 5 grams/100 cc. of water or less. Specifically, for purposes of the present invention an ammonium polyphosphate having a solubility of a specified value refers to the solubility value in grams per 100 cc. of deionized water when 10 grams of said polyphosphate is slurried in 100 cc. of water at 25° C. for 60 minutes.

The degree of polymerization of the substantially water-insoluble ammonium polyphosphates is difficult to determine since known methods for determining such are "so-called" solution methods, that is, they employ solution techniques for polymerization measurements. For example, as determined by the end group titration method [Van Wazer, Griffith and McCullough, Anal. Chem., 26, 1755 (1954)] after converting the ammonium polyphosphate to the acid form by ion exchange resins [Van Wazer and Holst, J. Am. Chem. Soc., 72, 639 (1950)], the average numerical value of $n$ is from about 20 to about 400, preferred from about 40 to about 400; whereas, as determined by the method of light scattering or viscosity correlations obtained from light scattering [Strauss and Wineman, J. Am. Chem. Soc., 80, 2366 (1958)] modified by use of the Zimm plot method [Stacey, "Light-Scattering in Physical Chemistry," Butterworths, London (1956)] the weight average value of $n$ is above about 500 and preferred from about 500 to about 100,000 with from about 1,000 to about 30,000 being especially preferred.

The polyphosphates of the instant invention can be prepared by, in general, heat treating urea phosphate and reaction products of condensed phosphoric acids and combined ammoniating and condensing agents and/or heat treating the combined ammoniating and condensing agents with various ammonium phosphate materials, such as, ammonium orthophosphates, ammonium pyrophosphates and the combined ammoniating and condensing agent, and the like. It should be noted that the heat treating step should preferably be conducted under substantially anhydrous conditions when a high degree of polymerization is desired since water present during the heat treating step tends to reduce the degree of condensation and thus the degree of polymerization.

Condensed phosphoric acid is a phosphoric acid containing any quantity of one or more polyphosphoric acids and/or metaphosphoric acids and any such acid can be employed in this invention. The polyphosphoric acids include pyrophosphoric acid and other polymers from the tri- to the nonapolymer and higher. The properties and compositions of the condensed phosphoric acids vary with the $P_2O_5$ content of the condensed phosphoric acid as discussed in Van Wazer, Phosphorus and its Compounds, Interscience Publishers, Inc., New York, N.Y., volume 1 (1958), and shown by table 12–1, page 748. Although, in general, for the instant invention any condensed phosphoric acid is suitable as the acid source, the preferred condensed phosphoric acids are liquid mixtures ranging from about 72 percent $P_2O_5$ by weight which contains about 89.4 percent orthophosphoric acid and 10.6 percent pyrophosphoric acid to about 85 percent $P_2O_5$ by weight which contains about 1.3 percent orthophosphoric acid, 1.8 percent pyrophosphoric acid, 214 percent tripolyphosphoric acid, and about 94 percent of polyphosphoric acid polymers higher than tripolyphosphoric acid.

Typical of the ammoniating and condensing agents which are suitable for use in the instant invention are those nitrogeneous compounds which are capable of releasing ammoniacal nitrogen and condensing with the phosphorus-containing reactant or reactants at temperatures in the range between about 170° C. and about 260° C. In particular are the compounds containing one or more amide groups, i.e., a compound resulting from replacement of one or more atoms of hydrogen in ammonia by univalent acid radicals, and particularly the primary amides, and containing the elements carbon and/or sulfur, nitrogen, oxygen and hydrogen as well as containing no carbon-carbon bonds. Preferably the compounds are non-cyclic structures and there are few, if any, compounds which contain 3 or more amide groups which can be used in practicing the present invention. Especially preferred are low molecular weight nitrogeneous compounds, i.e., having a molecular weight below about 200, and containing at least one but no more than 2 of the following radicals: carbamyl, carbamic, sulfamino, sulfamyl and ureido. As being illustrative of such compounds are urea, ammonium carbamate, biuret, sulfamide, sulfamic acid, ammonium sulfamate, guanyl urea, methyl urea, amino urea, 1-3-diamino urea, biurea and the like with urea, because of its relative inexpensiveness and ready availability, being particularly preferred.

One method for preparing polyphosphates of the instant invention entails reacting condensed phosphoric acid and the combined ammoniating and condensing agent and heat treating the reaction product. In general, it is usually only necessary to add the combined ammoniating and condensing agent to the condensed phosphoric acid, preferably admixing the reactants, and heating the admixture for the reaction to take place. Usually amounts of the combined ammoniating and condensing agent and condensed phosphoric acid between about 1 to about 5 on a nitrogen to phosphorus molar ratio basis of reactants are suitable with a molar ratio of between about 1 and about 3.0 being particularly preferred. Since the final products, i.e., ammonium polyphosphates, have ammoniacal nitrogen to phosphorus molar ratios of about 1, large excess amounts of ammoniacal nitrogen tend to produce by products formed from the combined ammoniating and condensing agents, such as, cyanuric acid and the like when using urea as the ammoniating and condensing agent. In most cases, the reaction is exothermic at about 120° C. to about 150° C., although if the heat is applied continuously for longer periods of time, i.e., about 1 to about 6 hours, the reaction can be made to proceed using temperatures as low as 110° C. The reaction product is believed to be short chain ammonium polyphosphates with an average chain length of less than 10 which are relatively water-soluble. This product is then heat treated at temperatures and for periods of time sufficient to form the compounds of the instant invention. The times and temperature required will depend upon, inter alia, the degree of polymerization desired as well as upon the proportions and physical states, i.e., degree of subdivision, uniformity of mixing, etc., of the reactants. In general, the times necessary to produce the desired product are dependent on the temperatures used with higher temperatures requiring shorter periods of time for heat treating. It should be noted, however, that it may be advantageous at times to heat treat the reaction product short of substantially complete conversion to the desired ammonium polyphosphates and, therefore, relatively low heat treating temperatures may be used for relatively short heat treating time periods. When substantially complete conversion of the reaction product is desired, temperatures between about 210° C. and about 240° C. for periods of time between about 30 minutes and 1½ hours are preferred, although temperatures as low as 180° C. for periods of time between about 3 and 4 hours as well as temperatures as high as about 255° C. for periods of time between about 5 minutes and 30 minutes are sufficient in some cases to produce the water-insoluble ammonium polyphosphate compounds of the instant invention. In general, temperatures less than about 180° C. are insufficient to form the compounds of the instant invention while temperatures in excess of about 260° C. tend to degrade or decompose the compounds thereby preventing the formation of compounds with the desired chain lengths and properties.

Another method for preparing the polyphosphates of the instant invention entails reacting orthophosphoric acid and a combined ammoniating and condensing agent and heat treating the reaction product in the presence of a combined ammoniating and condensing agent. Usually, any concentration of orthophosphoric acid can, in general, be used although it is preferred that concentrations above about 40% by weight be used and particularly preferred are concentrations of 85% and higher. In general, it is usually only necessary to add the combined ammonating and condensing agent to the orthophosphoric acid, preferably admixing the reactants, and heating the admixture for the reaction to take place. As was applicable when using the condensed phosphoric acid as a reactant as hereinabove described, amounts of reactants can vary but between about 0.7 and about 5 on a nitrogen to phosphorus molar ratio basis are preferred. Since orthophosphoric acid can contain water and since water in the product has deleterious effects on the product obtained from heat treating as hereinabove described it may be necessary in some cases to prevent or minimize the possibility of water in the reaction product by using excess amounts of the combined ammoniating and condensing agent in order to remove the water by hydrolysis. In most cases, the reaction will occur between about 110° C. to about 140° C. with the temperature being maintained for a sufficient time to produce the reaction product. Usually the reaction is initiated as soon as the temperature is reached although in some cases it may be necessary to maintain the temperature for 1 hour or even longer, that is, up to about 3 hours. Depending upon the nitrogen to phosphorus molar ratio of reactants used, the reaction product produced is, in general, an ammonium pyrophosphate or mixtures of ammonium pyrophosphates. For example, when using a nitrogen to phosphorus molar ratio of reactants of about 1 the diammonium pyrophosphate is formed. When using a ratio of between about 1.4 to about 1.75 a new and novel ammonium pyrophosphate salt is formed having an empirical formula of $(NH_4)_{2.7}H_{1.3}P_2O_7$ which exhibits a distinctive X-ray diffraction pattern and is relatively water-soluble. When using a ratio of between about 2.50 and 4.0 a new and novel ammonium pyrophosphate salt is formed having an empirical formula of $(NH_4)_{3.3}H_{.7}P_2O_7$ which exhibits a distinctive X-ray -diffraction pattern was heated to about 123° C. at which temperature an exothermic reaction was initiated and the temperature was raised to and maintained at about 130° C. for about 45 minutes. The product, a water-soluble solid mass, with the empirical formula $(NH_4)_{3.3}H_{.7}P_2O_7$ gives the following distinctive X-ray diffraction pattern:

X-RAY DIFFRACTION DATA [a] FOR $(NH_4)_{3.3}H_{.7}P_2O_7$

| Line [b] | d, A. |
|---|---|
| 1 | 3.32 |
| 2 | 5.47 |
| 3 | 3.25 |
| 4 | 5.71 |
| 5 | 5.03 |
| 6 | 3.87 |
| 7 | 3.05 |
| 8 | 3.17 |
| 9 | 4.62 |
| 10 | 2.40 |
| 11 | 3.37 |
| 12 | 3.72 |
| 13 | 6.69 |
| 14 | 5.37 |
| 15 | 3.75 |

[a] CuK α-radiation.
[b] Fifteen strongest lines in order of decreasing intensity.

This ammonium pyrophosphate was then heat treated with urea using proportionate amounts on a nitrogen (from urea) to phosphorus (from ammonium pyrophosphates) molar ratio basis of about 1 at about 210° C. for about 1 hour and resulted in an ammonium polyphosphate analyzing as follows:

Ammoniacal nitrogen to phosphorus molar ratio __ .97
Average chain length [1] _____ 225
Solubility _____ 3.01

[1] Determined by end group titration method, supra.

EXAMPLE III

In this reaction the same reactants used in Example II were used in proportionate amounts on a nitrogen to phosphorus molar ratio of about 1.6. The product, a water-soluble solid mass, with the empirical formula $(NH_4)_{2.7}H_{1.3}P_2O_7$, gives the following distinctive X-ray diffraction pattern:

X-RAY DIFFRACTION DATA [a] FOR $(NH_4)_{2.7}H_{1.3}P_2O_7$

| Line [b] | d, A. |
|---|---|
| 1 | 5.40 |
| 2 | 4.90 |
| 3 | 3.23 |
| 4 | 3.20 |
| 5 | 6.28 |
| 6 | 3.78 |
| 7 | 4.27 |
| 8 | 2.75 |
| 9 | 2.83 |
| 10 | 9.71 |
| 11 | 3.60 |
| 12 | 3.39 |
| 13 | 4.21 |
| 14 | 3.11 |
| 15 | 3.32 |

[a] CuK α-radiation.
[b] Fifteen strongest lines in order of decreasing intensity.

This ammonium pyrophosphate was then heat treated with urea using proportionate amounts on a nitrogen (from urea) to phosphorus (from ammonium pyrophosphate) molar ratio basis of about 1 at about 210° C. for about 1 hour and resulted in an ammonium polyphosphate analyzing as follows:

Ammoniacal nitrogen to phosphorus molar ratio ___ .96
Average chain length as determined by end group titration method, supra _____ 95

This product gave the same X-ray diffraction pattern as the product obtained in Example I.

EXAMPLE IV

In this reaction urea phosphate, an addition compound prepared by the co-crystallization of condensed phosphoric acid, 76% $P_2O_5$ by weight and urea, was heat treated at about 210° C. for about 1 hour. The product, ammonium polyphosphate, analyzed as follows:

Ammoniacal nitrogen to phosphorus molar ratio __ .94
Average length of phosphorus chain [1] _____ 47
Solubility _____ 2.75

[1] Determined by end group titration method, supra.

This product gave the same X-ray diffraction pattern as the product obtained in Example I.

EXAMPLE V

In this reaction a mixture of monoammonium orthophosphate and urea having a nitrogen (from urea) to phosphorus (from ammonium orthophosphates) molar ratio of about 2.4 was heat treated at about 245° C. for about 30 minutes. The product, ammonium polyphosphate, analyzed as follows:

Ammoniacal nitrogen to phosphorus molar ratio __ .96
Average length of phosphorus chain [1] _____ 68
Solubility _____ 3.7

[1] Determined by end group titration method, supra.

This product gave the same X-ray diffraction pattern as the product obtained in Example I.

As hereinbefore mentioned, the compounds of the instant invention are useful as fire-retardant additives in oil-based and water-based paint formulations. Usually amounts by weight of between about 5 to about 90% by weight of the total solids present are sufficient in the oil-based and water-based paint formulations. In particular, they are useful in water-based intumescent fire-retardant type paints. In general, such paints comprise an aqueous dispersion of a binder or film-forming latex and intumescent solids, with the latex and intumescent solids comprising between about 30 to about 90 percent by weight of the total paint composition.

The binder or film-forming latex suitable for incorporation into the new compositions is usually of about 40% to about 70% solids and is, in general, used in amounts to provide between about 10 and about 35% of the latex solids based on the total weight of the solids present in the composition. Any aqueous latex-like dispersion of a polymer, capable of forming films, is satisfactory for the purpose. Typical of polymeric materials which may be employed in a latex which is capable of forming films are the polymers of vinyl acetate; copolymers of vinylidene chloride and acrylonitrile; copolymers of vinylidene chloride and vinyl chloride; copolymers of vinylacetate and acrylate; copolymers of vinylchloride and acrylate; and copolymers of styrene and acrylate. As is known in the art, some latexes require a plasticizer to be film-forming while others do not. The nature and amount of any plasticizer required may, if not known, be easily determined by preliminary experiment.

and is relatively water-soluble. It should be noted that when using molar ratios other than the foregoing, mixtures of various ammonium pyrophosphates are formed. The product, an ammonium pyrophosphate or a mixture of ammonium pyrophosphates, can then be heat treated with a combined ammoniating and condensing agent at temperatures and for periods of time sufficient to form the compounds of the instant invention. When substantially complete conversion of the reaction product is desired, temperatures between about 170° C. and about 260° C. for periods of time between about 15 minutes and 3 hours are preferred, with temperatures of between about 180° C. to about 220° C. for about 1 to 2 hours being particularly preferred, to produce the water-insoluble ammonium polyphosphate compounds of the instant invention. Usually amounts of the combined ammoniating and condensing agent and the ammonium pyrophosphate between about 1 to about 7 on a nitrogen (from the combined ammoniating and condensing agent) to phosphorus (from the ammonium pyrophosphates) molar ratio basis of reactants are suitable with a molar ratio of between about 1 and about 3 being particularly preferred. As was applicable with heat treating the reaction product formed by reacting condensed phosphoric acid and the combined ammoniating and condensing agent relatively low temperatures are insufficient to form the compounds of the instant invention (less than about 170° C.), while temperatures in excess of about 260° C. tend to degrade or decompose the product, thereby preventing formation of compounds with the desired chain lengths and properties.

A further method for preparing the polyphosphates of the instant invention entails heat treating urea phosphate, believed to be an addition compound of urea and phosphoric acid, under conditions which are applicable to heat treating the reaction product of condensed phosphoric acid and the combined ammoniating and condensing agent as discussed hereinabove.

A still further method for preparing the polyphosphates of the instant invention entails reacting ammonium phosphate salts i.e., monoammonium orthophosphate, diammonium orthophosphate, triammonium phosphates, and mixtures thereof with the combined ammoniating and condensing agent. In general, it is usually only necessary to admix the ammonium phosphates and the combined ammoniating and condensing agent and heat treat the admixture in order to produce the compounds of the instant invention. Usually amounts of the combined ammoniating and condensing agent and ammonium phosphates between about 1 to about 7 on a nitrogen (from the combined ammoniating and condensing agent) to phosphorus (from the ammonium orthophosphate) molar ratio basis of reactants are suitable, with a molar ratio of between about 1 and about 3 being particularly preferred. In general, the reactants need only be heated to temperatures sufficient to form a melt and then heat treating the melt for a time sufficient to produce the compounds of the instant invention. In most cases, temperatures as low as 170° C. for about 1 hour and as high as 250° C. for about 5 minutes are suitable with temperatures of about 210° C. for about 30 minutes being particularly preferred.

The compounds of the instant invention, i.e., ammonium polyphosphates, are useful for a number of different applications in addition to their usefulness as fire-retardants in many different applications, such as plastics, textiles and paint compositions. They are also useful as fertilizer materials.

The following examples are presented to illustrate the invention, with parts by weight being used in the examples unless otherwise indicated.

EXAMPLE I

Several reactions were run using condensed phosphoric acid (76% $P_2O_5$ by weight) and urea as the reactants. The results are tabulated in Table 1. The reactions were carried out by adding condensed phosphoric acid to the reactor and stirring while the urea was being added thereto. The proportionate amounts and temperatures used in carrying out the reactions are as indicated in the table. The reactions were exothermic and the reaction products, solid masses, believed to be short chain, i.e., an average chain length of less than 10, ammonium polyphosphates, were hygroscopic and highly water-soluble.

TABLE 1

| Nitrogen to phosphorus molar ratio of reactants | Ammoniacal nitrogen to phosphorus molar ratio of product | Average length of phosphorus chains [1] | Temperature, ° C. |
|---|---|---|---|
| (1) 1.0 | .75 | 3.0 | 150 |
| (2) 1.25 | .93 | 4.8 | 150 |
| (3) 1.46 | .81 | 4.8 | 140 |
| (4) 1.75 | .87 | 3.7 | 140 |
| (5) 2.0 | .97 | 3.9 | 130 |
| (6) 2.5 | .96 | 3.9 | 130 |

[1] Determined by end group titration method, supra.

Table 2 below is the tabulated results of heat treating the reaction products of Table 1 at the indicated temperatures for periods of time of about 1 hour. The heat treatment was carried out on static bed samples placed in a forced draft oven. Forty gram samples were used of −16 mesh (USSS series) material.

TABLE 2

| | Ammoniacal nitrogen to phosphorus molar ratio of product | Average length of phosphorus chains [1] | Solubility |
|---|---|---|---|
| Temperature, ° C.: | | | |
| (1) 200 | .78 | 48 | 8.9 |
| (2) 235 | .75 | 70 | 2.6 |
| (3) 235 | .82 | 70 | 2.6 |
| (4) 225 | .92 | 110 | 6.0 |
| (5) 210 | .87 | 45 | 2.4 |
| (6) 200 | .87 | 166 | 3.7 |

[1] Determined by end group titration method, supra.

The following is the X-ray diffraction pattern for the ammonium polyphosphates prepared in Table 2.

X-RAY DIFFRACTION DATA [a] FOR AMMONIUM POLYPHOSPHATES

| Line [b] | d, A. |
|---|---|
| 1 | 6.06 |
| 2 | 5.47 |
| 3 | 3.83 |
| 4 | 3.50 |
| 5 | 3.24 |
| 6 | 3.42 |
| 7 | 2.30 |
| 8 | 2.30 |
| 9 | 2.82 |
| 10 | 2.75 |

[a] CuK α-radiation.
[b] Ten strongest lines in order of decreasing intensity.

It is sometimes advantageous to water leach the ammonium polyphosphates in order to remove, if present, any water-soluble materials therein such as the ammonium orthophosphates. The following table indicates the result of water leaching on the various properties as indicated.

TABLE 3

| Property | Not leached | Leached |
|---|---|---|
| Percent P | 30.75 | 30.4 |
| Percent orthophosphate | 3.7 | 2.25 |
| Chain length [1] (average) | 168 | 201 |
| Ammoniacal nitrogen to phosphorus ratio | .85 | .91 |
| Solubility | 2.04 | .62 |

[1] Determined by end group titration method, supra.

EXAMPLE II

In this reaction 85% orthophosphoric acid was added to the reactor and stirred while urea was added. The proportionate amounts of reactants used were a nitrogen to phosphorus molar ratio of about 3.25. The admixture The intumescent solids which form about 65 to 90% based on the total weight of the solids present in the composition are comprised of a spumific or foam-producing substance and a carbonific or carbon-yielding substance. In general, the spumific may be employed in amounts between about 5 to about 75% based on the total weight of intumescent solids. The compounds of the instant invention, ammonium polyphosphates, have been found to be effective as spumifics and because they are water insoluble and compatible with other compounds in the compositions an improved intumescent fire-retardant paint composition can be prepared.

The carbonifics which are preferred are preferably employed in amounts between about 5 to about 75% based on the total weight of the intumescent solids and, in general, may be either an admixture or pre-formed products of resinous carbonifics such as urea and a source of formaldehyde such as paraformaldehyde, or urea-formaldehyde resins or melamine-formaldehyde resins. In addition, non-resinous carbonifics may be used solely or in conjunction with the resinous carbonifics and which include carbohydrates, modified starches, and similar substances, a water-dispersible protein and a gelatin or casein or a polyhydric compound such as hexitols (mannitol), pentitols (arabitol), mono-pentaerythritol, the poly-pentaerythritols, that is, polymeric forms, for example, as a dimer, trimer and the like, such as di-pentaerythritol and tripentaerythritol and mixtures thereof, and solid chlorinated paraffin material containing from about 40% to about 70% by weight of chlorine. Improved results can oftentimes be obtained from adding to the non-resinous carbonific an amine compound such as dicyandiamide, urea, melamine, dimethyl urea, glycine and the like with dicyandiamide and melamine being preferred. Usually amounts of such amine compounds of between about 5 to about 75% based on total weight of carbonific solids are preferred. It is possible to use a mixture of two or more of the above-mentioned compounds. It is preferred that the carbonific component contain at least some of the chlorinated paraffin which not only tends to act to produce a carbon yielding substance but also tends to produce foam.

It is preferred that the following list of carbonifics be employed in the amounts as indicated:

| Carbonific: | Amount (percent of total weight of carbonific solids) |
|---|---|
| (1) Urea-formaldehyde or melamine-formaldehyde | 0 to 20 |
| (2) Dipentaerythritol or tripentaerythritol | 5 to 30 |
| (3) Chlorinated paraffins | 10 to 50 |
| (4) Dicyandiamide or melamine | 10 to 50 |

In addition, various other additives may be incorporated into the composition such as dyes, pigments, swelling agents, wetting agents, dispersing agent, fungicides or bactericides and the like. In general, these additives are, if used, employed in minor amounts usually less than about 15% by weight of the total weight of the composition.

In preparing the composition, water and the components to be incorporated into the composition other than the latex film-forming additive and the plasticizer, if used, are mixed and ground together such as in a pebble mill for varying lengths of time dependent on the ingredients used and the desired paint properties, such as sheen, smoothness and the like, but usually from about 15 minutes to about 5 hours is sufficient, and then the film-forming additive and plasticizer, if used, are introduced into the composition under agitation and mixed usually for about 15 to about 30 minutes.

The following example is presented to illustrate the invention with parts by weight being used in the example unless otherwise indicated.

EXAMPLE VI

The following water-based intumescent paint composition is provided:

| Additive: | Percent |
|---|---|
| Water | 31.0 |
| Wetting agents | .5 |
| $TiO_2$ | 8.0 |
| Ammonium polyphosphate[1] | 24.0 |
| Urea-formaldehyde resins | 2.0 |
| Dicyandiamide | 8.0 |
| Dipentaerythritol | 4.0 |
| Chlorinated paraffins, about 70% chlorine by weight | 5.0 |
| Polyvinyl acetate emulsion, about 60% solids | 16.0 |
| Dibutyl phthalate | 1.0 |
| Carboxymethyl cellulose | .5 |
| Total | 100.0 |

[1] Ammoniacal nitrogen to phosphorus molar ratio—.94, average chain length (end group titration method, supra)—47, solubility—3.0.

The above composition was tested for its performance as a fire-retardant intumescent type coating in a test similar to that prescribed in ASTM E–84–50T except that a 2-foot tunnel was used instead of a 25-foot tunnel. The results using this tunnel, however, correlate very well with the results using the 25-foot tunnel. In this test a 2-foot Grade A red oak panel, 1-inch thick, which has been pre-conditioned at 77° F. and 50% R.H. is used as a standard with 100 being determined by the maximum distance the flame reaches on the panel in 4 minutes. In addition, an asbestos-cement panel of the same dimensions is used as 0 reference under the same conditions as set forth for the red oak panel. The flame rating is the distance the flame travels in 4 minutes expressed as a percentage between the reference 0 used and the reference 100 used. The following are the results of the test on a test panel ¼ x 4 x 24 inches of yellow poplar heartwood which had applied thereto a coverage of about 243 ft.²/gal. of the composition of Example VI.

TABLE 4

Flame rating—18%
Height of foam—8 mm.

A flame rating less than 25 on the ASTM E–84–50T test is necessary for a class A rating. The coating tested gave a rating of 18 with a foam height of 8 mm. with the intumescence being a contiguous layer of highly charred puffed material indicating a suitable proportion of spumific to carbonific was used.

EXAMPLE VII

The following water-based intumescent paint composition was prepared:

| Additive: | Parts by weight |
|---|---|
| Water | 103 |
| Wetting agents | 1.5 |
| Ammonium polyphosphate | 30 |
| Ethylene vinyl chloride copolymer | 111 |
| Melamine | 7.5 |
| Dipentaerythritol | 4.5 |
| Chlorinated paraffins (about 70% chlorine by weight) | 6 |
| Tetrachlorophthalic anhydride | 6 |

The above composition was mixed in a blender to give a smooth coating composition. After these were prepared, one sheet of polyethylene was coated with the above intumescent paint composition at a uniform level of 1.3 ounces per square yard. A lighted match was dropped onto the sheet coated with the paint composition. A small hole burned in the polyethylene sheet but was self-extinguishing and a similar sheet which was uncoated burned at the rate of 0.8 inch per minute. The polyethylene sheet is suitable for use as a tablecloth or drapery material thus a self-extinguishing fire-retarded material is produced. The polyethylene material is flexible and smooth and is suitable for imprinting with the desired pattern.

What is claimed is:

1. In an improved coating composition containing a film forming vinyl polymer or vinyl copolymer, a carbonific, and a solvent material, the improvement comprising a fire-retardant additive incorporated therein, said additive being a substantially water-insoluble ammonium polyphosphate composition having the following empirical formula $$H_{(n-m)+2}(NH_4)_m P_n O_{3n+1}$$

wherein $n$ is an integer having an average value greater than 10 and $m/n$ has an average value between about 0.7 and about 1.1.

2. The composition of claim 1 wherein $n$ is an integer having an average value of from about 20 to about 400 as determined by the end group titration method.

3. An intumescent coating composition comprising an aqueous dispersion of latex solids and intumescent solids in about 30 to about 90 percent by weight of the total composition, said latex solids being a film forming polymer emulsion of between about 40 to about 70 percent solids by weight and used in amounts to provide between about 10 and about 35 percent solids by weight of total solids present in said composition said polymer being a vinyl polymer or vinyl copolymer, said intumescent solids comprised of spumific solids and carbonific solids used in amounts to provide between about 65 to about 90 percent by weight of total solids present in said composition, said carbonific solids used in amounts to provide between about 5 to about 75 percent based on total weight of said intumescent solids, and said spumific being a substantially water-insoluble ammonium polyphosphate composition having the following formula $$H_{(n-m)+2}(NH_4)_m P_n O_{3n+1}$$

wherein $n$ is an integer having an average value greater than 10 and $m/n$ has an average value between about 0.7 and about 1.1, and used in amounts to provide between about 5 to about 75 percent based on total weight of said intumescent solids.

4. The composition of claim 3 wherein $n$ is an integer having an average value of from about 20 to about 400 as determined by the end group titration method.

5. The intumescent coating composition of claim 3, wherein said latex solids are film forming polymer emulsions selected from the group consisting of polyvinyl acetate emulsions, and copolymers of vinyl acetate and acrylate emulsions, and said carbonific solids selected from the group consisting of ureaformaldehyde resins, melamine-formaldehyde resins, polyhydric compounds, chlorinated paraffin materials, amine compounds, and mixtures thereof.

6. The composition of claim 5, wherein $n$ is an integer having an average value of from about 20 to about 400 as determined by the end group titration method.

7. The intumescent coating composition of claim 3, wherein said latex solids are film forming polyvinyl acetate emulsions and said carbonific solids are selected from the group consisting of urea-formaldehyde resins, melamine-formaldehyde resins, dicyandiamide, melamine, dipentaerythritol, tripentaerythritol, chlorinated paraffins and mixtures thereof.

8. The composition of claim 7, wherein $n$ is an integer having an average value of from about 20 to about 400 as determined by the end group titration method.

9. The composition of claim 1, wherein said ammonium polyphosphate composition has the following distinctive X-ray diffraction pattern with CuK α-radiation

| Line: | d, A. |
|---|---|
| 1 | 6.06 |
| 2 | 5.47 |
| 3 | 3.83 |
| 4 | 3.50 |
| 5 | 3.24 |
| 6 | 3.42 |
| 7 | 2.30 |
| 8 | 3.59 |
| 9 | 2.82 |
| 10 | 2.75 |

10. The composition of claim 3, wherein said ammonium polyphosphate composition has the following distinctive X-ray diffraction pattern with CuK α-radiation

| Line: | d, A. |
|---|---|
| 1 | 6.06 |
| 2 | 5.47 |
| 3 | 3.83 |
| 4 | 3.50 |
| 5 | 3.24 |
| 6 | 3.42 |
| 7 | 2.30 |
| 8 | 3.59 |
| 9 | 2.82 |
| 10 | 2.75 |

No references cited.

MORRIS LIEBMAN, Primary Examiner

S. L. FOX, Assistant Examiner

U.S. Cl. X.R.

23—106; 106—15; 252—8.1; 260—29.6, 853

PO-1050
(5/69)

UNITED STATES PATENT OFFICE
CERTIFICATE OF CORRECTION

Patent No. 3,562,197    Dated February 9, 1971

Inventor(s)  Paul G. Sears and Howard L. Vandersall

It is certified that error appears in the above-identified patent and that said Letters Patent are hereby corrected as shown below:

Column 2, line 17, "P-N-P linkages" should read -- P-N type linkages.--.

Signed and sealed this 27th day of June 1972.

(SEAL)
Attest:

EDWARD M.FLETCHER,JR.           ROBERT GOTTSCHALK
Attesting Officer               Commissioner of Patents